(12) United States Patent
Xue et al.

(10) Patent No.: US 9,461,727 B2
(45) Date of Patent: Oct. 4, 2016

(54) ADAPTIVE SECTORIZATION OF A SPATIONAL REGION FOR PARALLEL MULTI-USER TRANSMISSIONS

(71) Applicant: INTEL CORPORATION, Santa Clara, CA (US)

(72) Inventors: Feng Xue, Redwood City, CA (US); Qinghua Li, San Ramon, CA (US); Masoud Sajadieh, Fremont, CA (US); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/126,037

(22) PCT Filed: Sep. 5, 2013

(86) PCT No.: PCT/US2013/058240
§ 371 (c)(1),
(2) Date: Dec. 13, 2013

(87) PCT Pub. No.: WO2015/034503
PCT Pub. Date: Mar. 12, 2015

(65) Prior Publication Data
US 2015/0131750 A1    May 14, 2015

(51) Int. Cl.
| | |
|---|---|
| *H04W 72/04* | (2009.01) |
| *H04B 7/04* | (2006.01) |
| *H04B 7/02* | (2006.01) |
| *H04B 7/06* | (2006.01) |
| *H04W 24/08* | (2009.01) |

(52) U.S. Cl.
CPC ............ *H04B 7/0482* (2013.01); *H04B 7/024* (2013.01); *H04B 7/0452* (2013.01); *H04B 7/0456* (2013.01); *H04B 7/0617* (2013.01); *H04W 24/08* (2013.01)

(58) Field of Classification Search
CPC .. H04B 7/0482; H04B 7/024; H04B 7/0452; H04B 7/0456; H04B 7/0617; H04W 24/08
See application file for complete search history.

(56) References Cited

U.S. PATENT DOCUMENTS

| | | | |
|---|---|---|---|
| 2006/0233131 A1* | 10/2006 | Gore | ................... H04B 1/7143 370/328 |
| 2007/0049218 A1 | 3/2007 | Gorokhov et al. | |
| 2007/0205943 A1 | 9/2007 | Nassiri-Toussi et al. | |

(Continued)

OTHER PUBLICATIONS

International Search Report and Written Opinion received for PCT Patent Application No. PCT/US2013/058240, mailed on May 27, 2014, 14 Pages.

*Primary Examiner* — Dac Ha
(74) *Attorney, Agent, or Firm* — Thorpe North & Western LLP

(57) ABSTRACT

Technology to adaptively sectorize a spatial region for parallel multi-user transmissions is disclosed. In an example, a node (e.g., evolved Node B (eNB)) can include computer circuitry configured to: Generate a set of precoding matrices for a set of beam cones in the spatial region; and generate a beam cone for multi-user beamforming transmissions using system information for the beam cone. A precoding matrix in the set of precoding matrices can be used for each beam cone, and each beam cone can cover a beam cone spatial region that differs from another beam cone spatial region of another beam cone in the spatial region. Each beam cone can include system information that differs from the system information of the other beam cones in the spatial region.

21 Claims, 15 Drawing Sheets

(56) References Cited

U.S. PATENT DOCUMENTS

| | | | |
|---|---|---|---|
| 2009/0179797 A1* | 7/2009 | Kwon et al. | 342/368 |
| 2009/0318157 A1 | 12/2009 | Hoshino et al. | |
| 2010/0035600 A1* | 2/2010 | Hou et al. | 455/422.1 |
| 2010/0173639 A1 | 7/2010 | Li et al. | |
| 2012/0182895 A1 | 7/2012 | Jwa | |
| 2013/0235807 A1* | 9/2013 | Lee | H04W 16/28 370/329 |
| 2013/0343303 A1* | 12/2013 | Kim et al. | 370/329 |
| 2014/0185480 A1* | 7/2014 | Lee | H04W 36/30 370/252 |
| 2014/0362769 A1* | 12/2014 | Chen | H04J 11/0036 370/328 |
| 2015/0003325 A1* | 1/2015 | Sajadieh et al. | 370/328 |

* cited by examiner

SISO

SIMO

MISO

MIMO

ADAPTIVE SECTORIZATION OF A SPATIONAL REGION FOR PARALLEL MULTI-USER TRANSMISSIONS

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission (also known as a broadcast channel (BC)) can be a communication from the node (e.g., eNodeB) to the wireless device (e.g., UE), and the uplink (UL) transmission (also known as a multiple access channel (MAC)) can be a communication from the wireless device to the node.

Downlink and uplink channels or transmissions can use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers (i.e. separate carrier frequency for each transmission direction). In FDD, interference can be avoided because the downlink signals use a different frequency carrier from the uplink signals.

The eNB can have multiple antennas used for transmission to the UEs, allowing the eNB to use multiple-input and multiple-output (MIMO). MIMO is a smart antenna technology that refers to the use of multiple antennas at both the transmitter and receiver to improve communication performance, where input and output refer to a radio channel carrying the signal, not necessarily to the devices having antennas. In MIMO, up to eight transmit or receive antennas can be used, or up to eight channels can be used for transmission of a resource.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
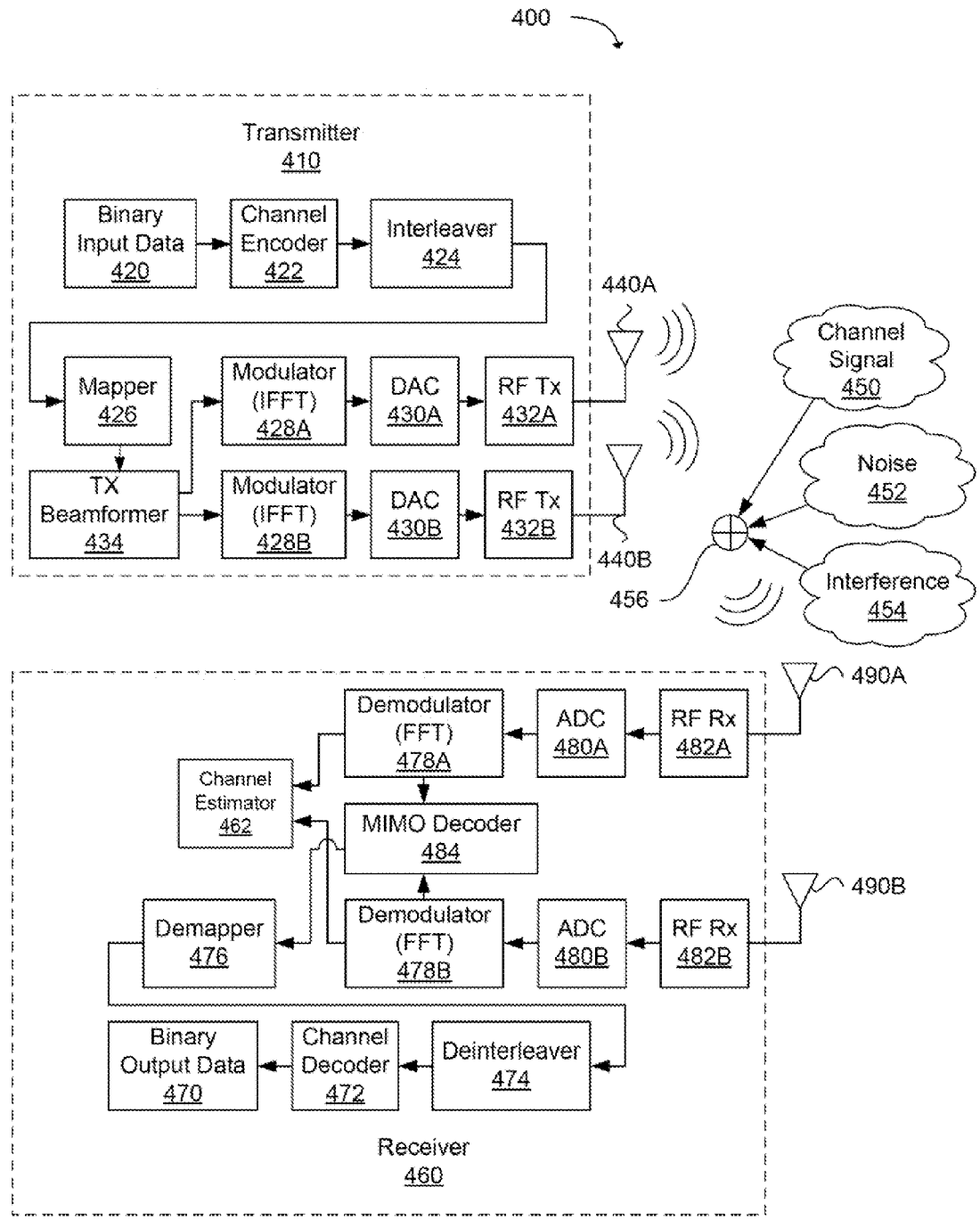
FIG. 1 illustrates a block diagram of the physical layer of a transmitter and receiver in an orthogonal frequency-division multiplexing (OFDM) wireless network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 1. A basic multiple-input multiple-output (MIMO) system is used for simplicity in illustrating the basic hardware transmission components, but the components can also be adapted for a complex MIMO system, a single-input and single-output (SISO) system, or similar system. For example in a MIMO system, at the transmitter 410, binary input data 420 can be protected through encoding using a channel encoder 422, interleaved against fading phenomenon using an interleaver 424, and mapped to improve reliability using a mapper 426. The mapped data can be separated into layers for antenna ports by a transmitter (TX) beamformer 434 and the layers can be OFDM modulated into OFDM symbols using modulators 428A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 430A-B. The analog signals can be transmitted via radio frequency (RF) transmitters (Txs) 432A-B configured to send the signal to transmitter antennas 440A-B operable to communicate the signal. The analog signals will follow a path referred to as a channel. The analog signals travelling through that path can be referred to as a channel signal 450. The physical layer can include other components (not shown), such as series-to-parallel (S/P) converters, parallel-to-serial (P/S) converters, cyclic prefix (CP) inserters and deleters, guardband inserters and deleters, and other desired components.

The transmitted channel signal 450 can be subject to noise 452 and interference 454. The interference can include intra-cell interference and intercell interference. Intra-cell interference can refer to interference from other channel signals transmitted within the cell of the transmitter 410. Intercell interference can refer to interference from other channel signals transmitted by neighboring cells. The noise and interference is represented as an addition 456 to the channel signal, which can be received by receiver antennas 490A-B and one or more radio frequency (RF) receivers (Rxs) 482A-B at the receiver 460. The channel signal combined with the noise and interference can be converted to a digital modulated signal with analog-to-digital converters (ADCs) 480A-B. The digital signal can be OFDM demodulated using demodulators 478A-B. The demodulators can use a fast Fourier transform (FFT) algorithm to compute the discrete Fourier transform (DFT) to generate demodulated signals (vector y for each antenna port). A channel estimator 462 can use the demodulated signal to estimate the channel 450 and the noise and interference that occurs in the channel. The channel estimator can include a feedback generator or be in communication with the feedback generator, which can generate a physical uplink shared channel (PUSCH) feedback report, such as a channel quality indicator (CQI) report, a precoding matrix indicator (PMI) report, a transmission rank indicator (RI) report, or a physical uplink control channel (PUCCH) (e.g., including RI or PMI). The CQI can be used to assist the MIMO transmissions modes. The demodulated signals can be combined using a MIMO decoder 484, demapped using a demapper 476, deinterleaved using a deinterleaver 474, and decoded by a channel decoder 472 to generate binary output data 470 that can be used by other layers of the receiving station.

Figure 2:
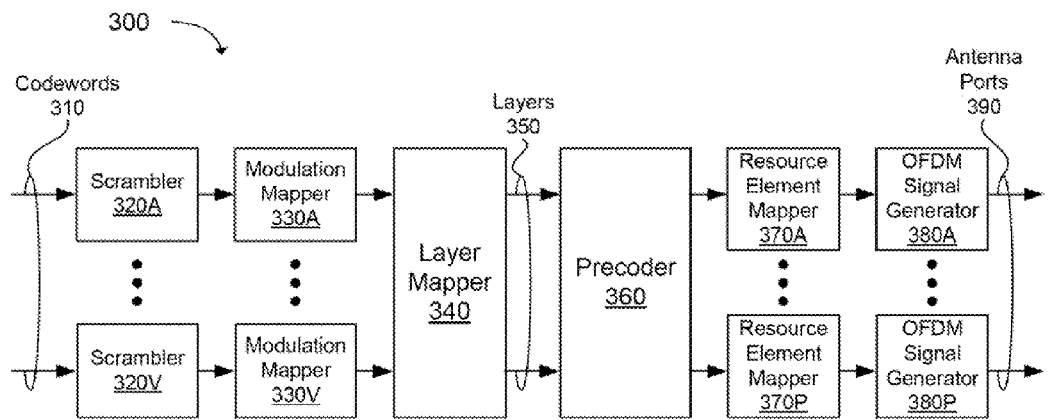
FIG. 2 illustrates a block diagram of physical channel processing of a physical channel processor in accordance with an example.

FIG. 2 illustrates additional details related to the interleaver 424, the mapper 426, the transmitter beamformer 434, and the modulators 428A-B of the physical channel processor shown in FIG. 1 for an LTE MIMO mobile communication system. Corresponding features can also exist on the receiver 460. The MIMO physical channel processor 300 of FIG. 2 can include scramblers 320A-V, modulation mappers 330A-V, a layer mapper 340, a precoder 360, resource element mappers 370A-P, and OFDM signal generators 380A-P. The scramblers can scramble each of the codewords 310 into coded bits to be transmitted on a physical channel. Modulation mappers can modulate scrambled bits to generate complex-valued modulation symbols. A layer mapper can map the modulation symbols onto a plurality of transmission layers 350. The precoder can precede the modulation symbols on each layer for transmission on antenna ports 590. The procoder can use a codebook known both at the transmitter (e.g., eNB) and the receiver (e.g., UE) or be calculated at the transmitter and transferred to or learned at the receiver. The codebook can define a set of vectors and matrices at both the transmitter and the receiver, which can achieve a high precoding gain, lower feedback overhead, and provide flexibility to support various antenna configurations and different numbers of data streams. The resource element mappers can map the modulation symbols for each antenna port to resource elements (REs). The OFDM signal generator can generate a complex-valued time-domain OFDM signal for each antenna port.

Figure 3:
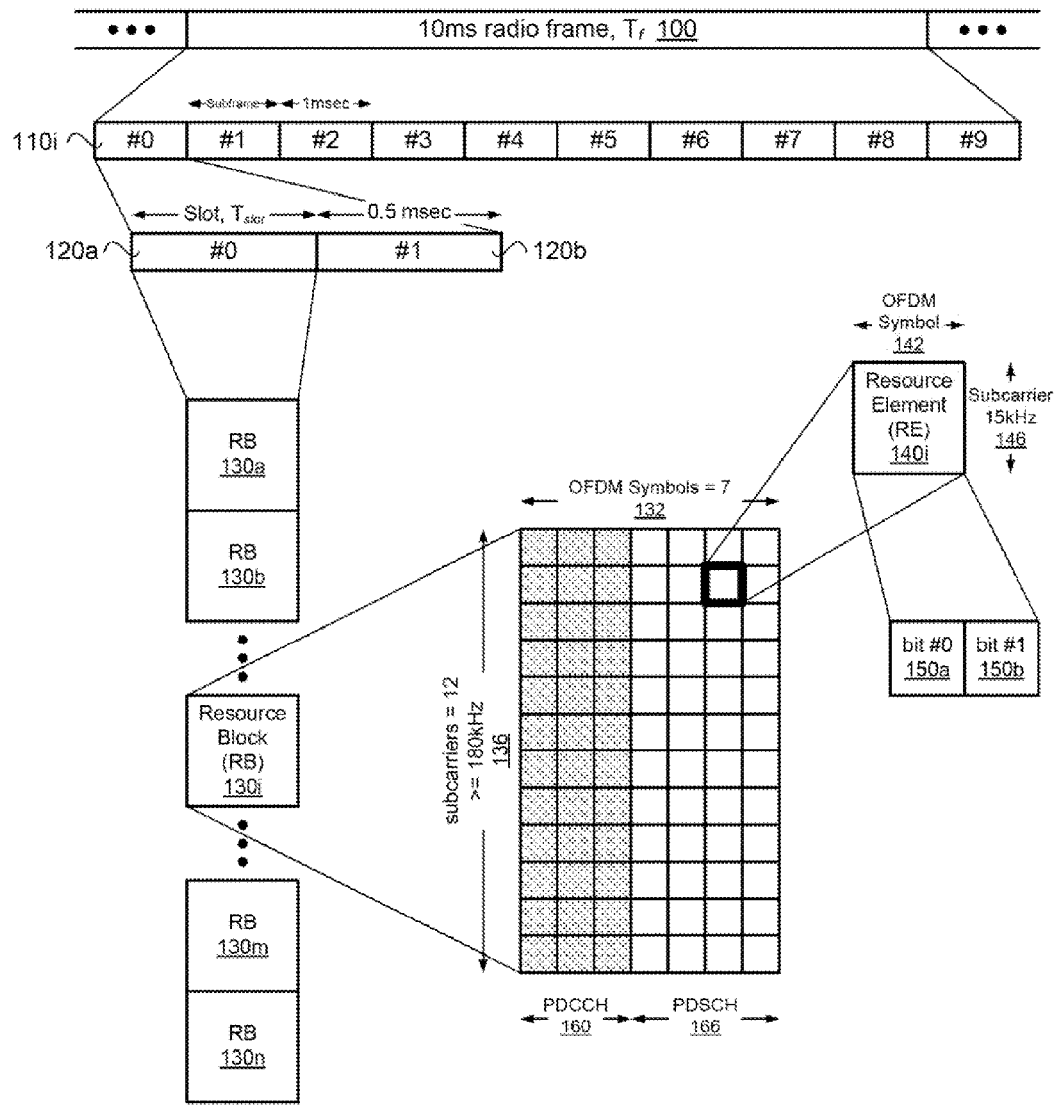
FIG. 3 illustrates a diagram of radio frame resources (e.g., a resource grid) for a downlink (DL) transmission including a legacy physical downlink control channel (PDCCH) in accordance with an example.

In one example, the resource elements (REs) can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 3.

FIG. 3 illustrates a downlink radio frame structure type 1. In the example, a radio frame 100 of a signal used to transmit the data can be configured to have a duration, Tf, of 10 milliseconds (ms). Each radio frame can be segmented or divided into ten subframes 110i that are each 1 ms long. Each subframe can be further subdivided into two slots 120a and 120b, each with a duration, Tslot, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDDCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130i can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Reference signals can be transmitted by OFDM symbols via resource elements in the resource blocks. Reference signals (or pilot signals or tones) can be a known signal used for various reasons, such as to estimate a channel and/or noise in the channel. Reference signals can be received and transmitted by transmitting stations and mobile communication devices. Different types of reference signals (RS) can be used in an RB. For example, in LTE systems, downlink reference signal types can include a cell-specific reference signal (CRS), a multicast\broadcast single-frequency network (MBSFN) reference signal, a UE-specific reference signal (UE-specific RS or UE-RS) or a demodulation reference signal (DMRS), positioning reference signal (PRS), and a channel-state information reference signal (CSI-RS).

Figure 4A:
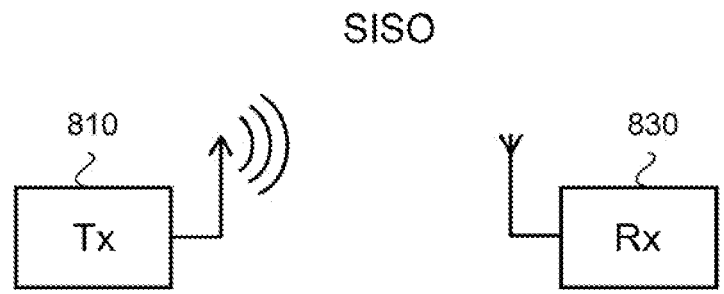
FIG. 4A illustrates a block diagram of a single-input single-output (SISO) wireless network in accordance with an example.
Figure 4B:
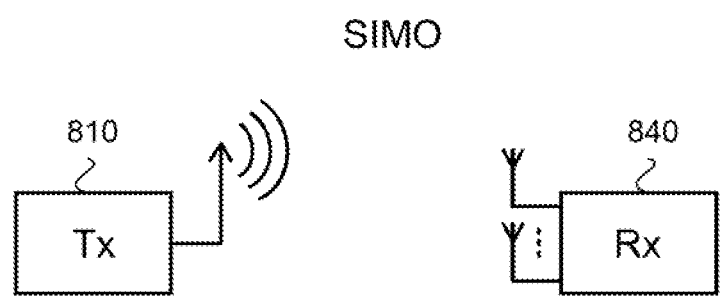
FIG. 4B illustrates a block diagram of a single-input multiple-output (SIMO) wireless network in accordance with an example.
Figure 4C:
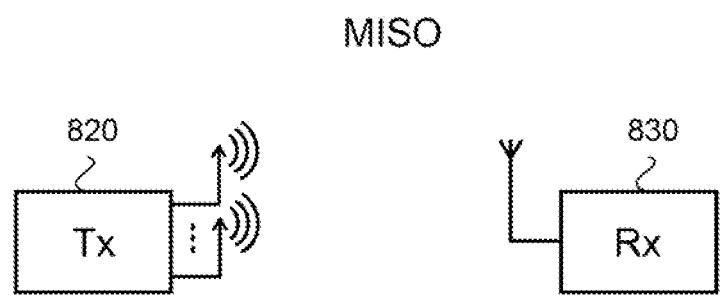
FIG. 4C illustrates a block diagram of a multiple-input single-output (MISO) wireless network in accordance with an example.
Figure 4D:
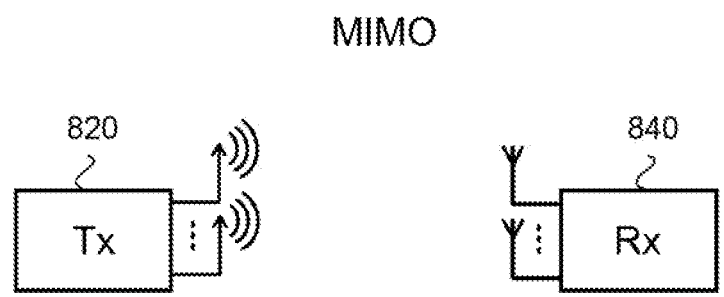
FIG. 4D illustrates a block diagram of a multiple-input multiple-output (MIMO) wireless network in accordance with an example.

FIG. 4A illustrates a wireless communication system using a single radio channel on a transmitting antenna port 810 and a single radio channel on receiving antenna port 830, which can be called a single-input single-output (SISO) wireless network. FIG. 4B illustrates a wireless communication system using a single radio channel 810 on a transmitting antenna port and multiple radio channels on a number of receiving antenna ports 840, which can be called a single-input multiple-output (SIMO) wireless network. FIG. 4C illustrates a wireless communication system using multiple radio channels on a number of transmitting antenna ports 820 and a single radio channel on a receiving antenna port 830, which can be called a multiple-input single-output (MISO) wireless network. FIG. 4D illustrates a wireless communication system using multiple radio channels on a number of transmitting antenna ports 820 and multiple radio channels on a number of receiving antenna ports 840, which can be called a multiple-input multiple-output (MIMO) wireless network. The terms input and output typically refers to the radio channel carrying the signal, and not to the devices having antennas.

A MIMO wireless network can be used for beamforming. Beamforming or spatial filtering is a signal processing technique used in antenna arrays for directional signal transmission or reception. Beamforming can be achieved by combining elements in a phased array in such a way that signals at particular angles experience constructive interference while others experience destructive interference. Beamforming can be used at both the transmitting and receiving ends in order to achieve spatial selectivity.

Cellular data demand continues to experience an increasing growth rate. Combined with the scarcity of available bandwidth, wireless and cellular systems can use MIMO to deliver drastically increased spectral efficiencies to address the capacity demand. Single-user (SU) and multi-user (MU) MIMO systems are integral parts of 3GPP Long Term Evolution (LTE) specifications with antenna dimensions of up to eight antennas in a base-station (e.g., eNodeB). However, an order of magnitude increase in the number of transmit antennas, known as massive MIMO or full-dimension MIMO, can result in significantly higher spectral efficiency.

Figure 5:
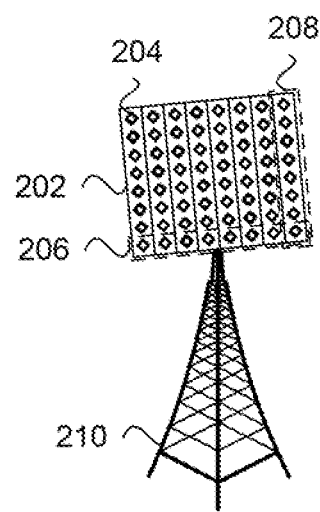
FIG. 5 illustrates a diagram of a cell with massive multiple-input multiple-output (MIMO) in accordance with an example.

Per-user data demand in wireless network continues to grow. The wireless link over the air, between base station (e.g., eNB) and mobile device (e.g., UE), can be a major bottleneck. Techniques for solving this bottleneck can be provided by a massive number of antennas at the base station site (e.g., eNB 210), as illustrated by FIG. 5. FIG. 5 depicts a large antenna array 202 that includes eight rows 206 and eight columns 208 of antenna radiation elements 202. In an example, each antenna radiation element can be treated as an antenna in massive MIMO. In another example, the large antenna array can have more than eight antenna radiation elements (or eight antennas), such as 64 antennas.

With many, even hundreds of antennas, relatively large gains in terms spectrum efficiency (in units of bit/second/Hertz (bit/s/Hz)) can be achieved. Multiplexing (e.g., spatial multiplexing) can support parallel transmissions to multiple UEs without significant mutual interference to each other.

However, many practical and standard related challenges can occur with massive MIMO.

For example, with legacy MIMO each antenna can have a separate feedback and/or measurement (e.g., CSI-RS). Legacy MIMO can supports up to 8 antenna ports. Practical constraints may not allow per-antenna channel state information (CSI) feedback for massive MIMO. In addition, too much channel feedback can sacrifice precious resources for non-data transmissions. Efficient and timely channel feedback and/or measurement can be addressed for any meaningful implementation of massive MIMO. Another challenge can be UE selection and pairing for spatial multiplexing (MU-MIMO). For instance, a benefit of massive MIMO can be massive MIMO's potential on supporting MU-MIMO with minimal interference. With limited channel feedback and UEs scattering across the area, addressing UE selection and pairing can be helpful on harnessing the massive MIMO. As with many technologies, providing legacy support, where a legacy UE can operate properly with a massive MIMO eNB, can also be beneficial. This enables legacy UEs to not be hurt by the implementation of massive MIMO. Solving these challenges can allow for standardization and a practical implementation.

The technology (e.g., eNBs, UEs, methods, computer circuitry, and systems) as described herein can resolve challenges associated with massive MIMO, and can provide further advanced techniques by taking advantage of other unique properties of massive MIMO. For example, with massive MIMO a cell can be adaptively sectorized to support parallel transmissions to multiple users (MU). In another example, architecture for supporting intra-cell and inter-cell interference coordination can be provided. The technology can be used to smoothly incorporate legacy support and provide advanced features for advanced UEs at a same time. In another configuration, the technology can provide a passive or active tracking mechanism, so that a virtual cell can cover 'moving' UEs for minimal feedback and/or handover.

Figure 6:
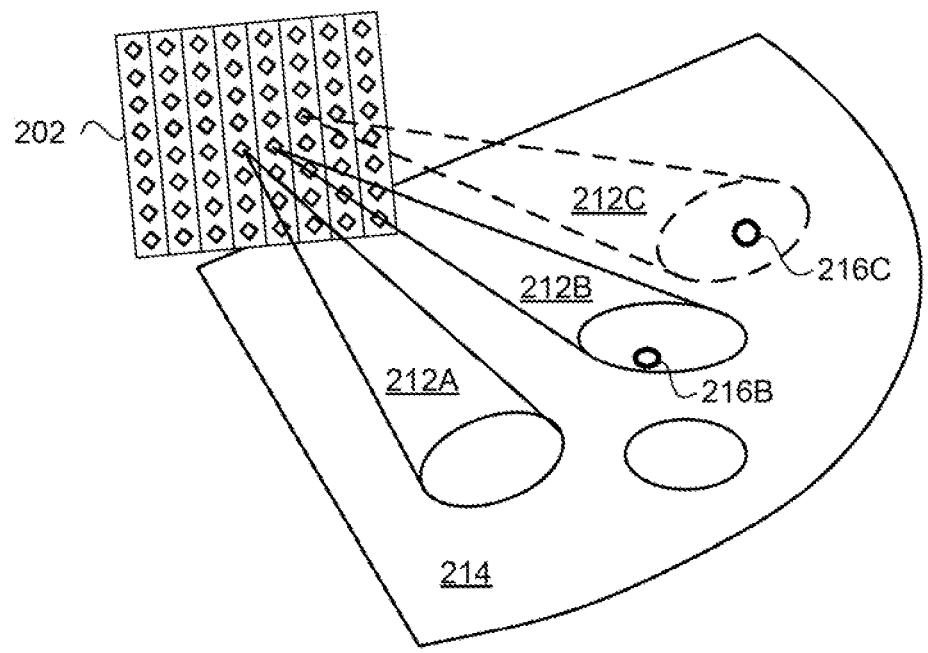
FIG. 6 illustrates a diagram of a multi-user-beamforming (MU-beamforming) to form several beam cones, virtual cells, or virtual sectors in accordance with an example.

As illustrated in FIG. 6, the eNB can apply multi-user-beamforming (MU-beamforming) to form several 'beam cones' 212A-C which can cover a substantial area of a cell 214. The beam cones can serve the UEs 216B-C of the cell. In an example, the plurality of beam cones can cover a whole sector or cell. Each beam cone can represent a virtual 'legacy' eNB cell, so that each beam cone can include its own system information. For instance, system information such as reference signals (RSs), cell-identifier (CID or cell-ID), antenna ports, primary synchronization signals (PSS), secondary synchronization signals (SSS), system information blocks (SIBs), control channels (e.g., a physical downlink control channel (PDCCH)) and so forth can be communicated in each beam cone.

The separate and distinct system information between beam cones can make the virtual cells within the cell transparent to legacy UEs. Each beam cone may also have new control signaling (e.g. DCI) for massive MIMO enabled UEs to take further advantage of massive MIMO. In another example, the eNB can adjust beam cones adaptively for better cell coverage and/or beamforming. In another configuration, the eNB can track UEs by adjusting beams either actively or passively. The eNBs or UEs may also perform inter-cell cone coordination for interference coordination.

Figure 7A:
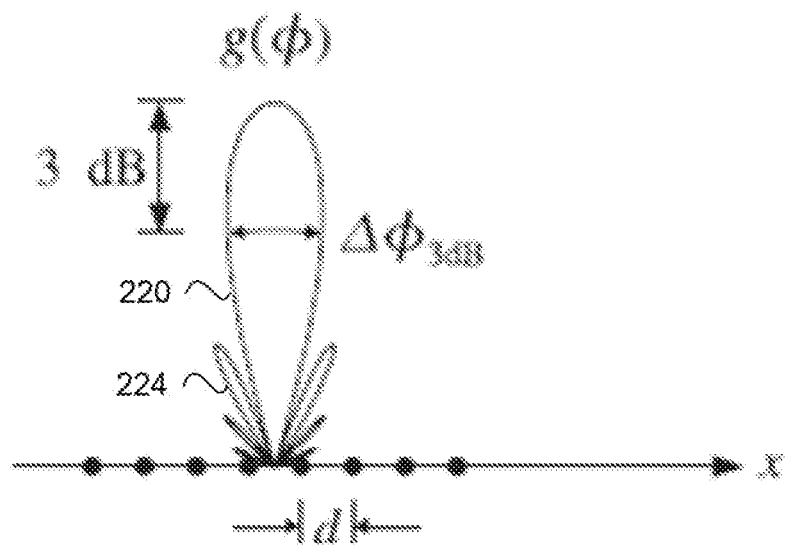
FIG. 7A illustrates a diagram of a beam direction by an antenna array in accordance with an example.
Figure 7B:
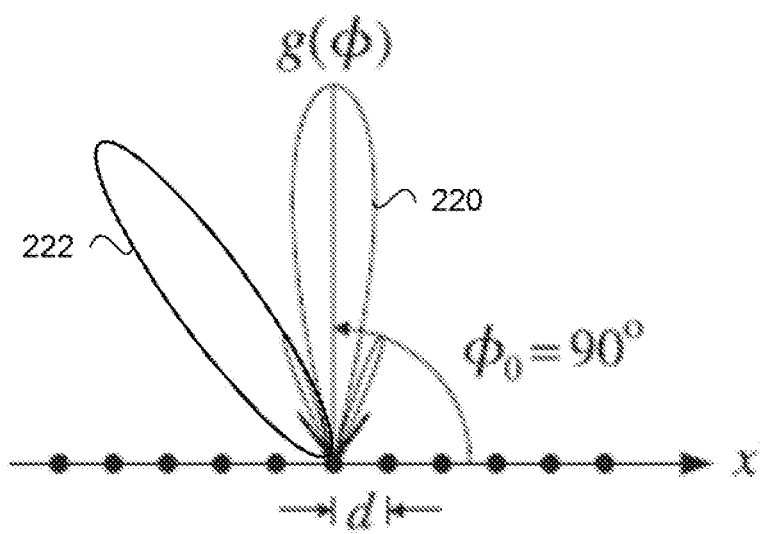
FIG. 7B illustrates a diagram of two beam directions by an antenna array in accordance with an example.

The following provides additional details of the examples. For illustration, M number of transmit antennas can be assumed at the eNB. As used herein, the terms 'beam cone', 'cone', 'virtual cell', and 'virtual sector' may be used interchangeably. FIG. 7A illustrates a simple beam direction (e.g., $\Phi=90°$) of a beam in two dimensions (2D) generated by an antenna array. In beamforming, a beam or a main lobe 220 can be generated. As part of beamforming, side-lobes 224 can also be generated. Side lobes can be lobes (e.g., local maxima) of a far field radiation pattern that are not the main lobe (i.e., the main beam from beamforming). The beams or beam cones can also be generated in three dimensions (3D). The each beam 220 and 222 can have a different direction to cover a different spatial region or area, as illustrated in FIG. 7B.

In an example, the technology can be used to design multi-cones. The eNB can design or generate a set of 'base-layer' precoding matrices. The precoding matrices can be used to form multiple cones that can divide the space into several cells (e.g., virtual cells). The precoding matrices can provide a function (e.g., $g(\Phi)$) to generate the size, shape, and/or angle of the beam cones. The size (e.g., narrow or wide), shape (e.g., rectangular or circular), and/or angle (e.g., $\Phi$) of the beam cone can depend on the eNB implementation and/or specific antenna array setup.

For example, the eNB can use or generate a set of K precoding matrices F:={F1, F2, ..., FK}, where Fk is of dimension M*L for a particular area in the sector or 'cone', and K is a number of beam cones for space. M is the number of transmit antennas, and L can be a number (e.g. 1, 2, 4, 8, 16, 32, or 64), corresponding to antenna ports. Different Fk's can cover different spatial regions of a 3D space, which can depend on an antenna shape. In an example, the set {F1, ..., FK} can attempt to cover a whole space or cell. The precoding matrices F can be dynamic and transparent to UEs.

From UEs' point of view or a protocol side, each cone (e.g., virtual cell) can be a real sector (e.g., real cell). As previously stated, each cone can have a distinct cell-id, distinct antenna ports, distinct PSS and/or SSS, or distinct SIBs. For example, the eNB can transmit the physical wireless signals for each virtual cell defined by Fk. The signal emitted from the eNB can be an aggregation of the various beam cones. The aggregated signal can have power normalization. For instance, the eNB's signal on system information (e.g., RS) can be represented as F1*s1+F2*s2+ ... +FK*sK, where sk is the system information.

In another example, each cone can operate as a virtual sector or virtual cell. The UEs associated with the virtual sector can feed back a report (e.g., CQI) based on effective channels. For example, with a UE j in cell k, the UE j can measure channel $H_j F_k S_k$, where $H_j$ is a channel impulse response for the UE j, $F_k$ is a precoding matrix for the virtual cell k, $S_k$ is a reference signal (e.g., cell-specific reference signal (CRS)) for the virtual cell k. Thus, the effective channel for UE j can be represented by $H_j F_k$.

For each virtual sector k, a UE uk can be chosen based on the collected reports. In an example, the eNB can select a UE uk based on a virtual sector k with a best report among the virtual sectors. The transmitted data signal from eNB can be represented by $$X = \sum_k F_k B_{u_k} X_{u_k},$$

where $F_k$ is the precoding matrix for the virtual cell k, $B_{u_k}$ is an UE-specific precoding matrix for the UE $u_k$, and $X_{u_k}$ is a modulation for the UE $u_k$. If k is equal to 1, then for a UE u1 (UE uk where k=1) in cluster represented by F1, a channel for the UE u1 can be represented by $Y_{u_1} = (H_{u_1} F_1)$ $B_{u_1} X_{u_1}$+Interference+Noise where $H_{u_1}$ is a channel impulse response for the UE $u_1$, $F_1$ is the precoding matrix for the virtual cell 1, $B_{u_1}$ is an UE-specific precoding matrix for the UE $u_1$, $X_{u_1}$ is a modulation for the UE $u_1$. In an example, $B_u$ can represent a precoder on top of a 'cone'. For example, the precoder $B_u$ can be designed or generated based on $(H_{u_1} F_1)$. The Interference can be represented by $$\sum_{k \neq 1} (H_{u_1} F_k) B_{u_k} X_{u_k},$$

where $H_{u_1}$ is a channel impulse response for the UE $u_1$, $F_k$ is the precoding matrix for the virtual cell k, $B_{u_k}$ is an UE-specific precoding matrix for a UE $u_k$, and $X_{u_k}$ is a modulation for the UE $u_k$. In an example, each channel $(H_{u_1} F_k)$ can be close to 0 for k not equal to 1, which is possible because beams to different directions can be implemented with massive antennas.

In another configuration, the virtual cones (e.g., beam cones) can be dynamically adapted to the conditions of a cell or sector. For instance, an initial design or determination of the virtual cones may not be suitable for the cell due to various reasons, such as changing UEs, changing channels, multipath due to reflection, or gaps in coverage.

Figure 8:
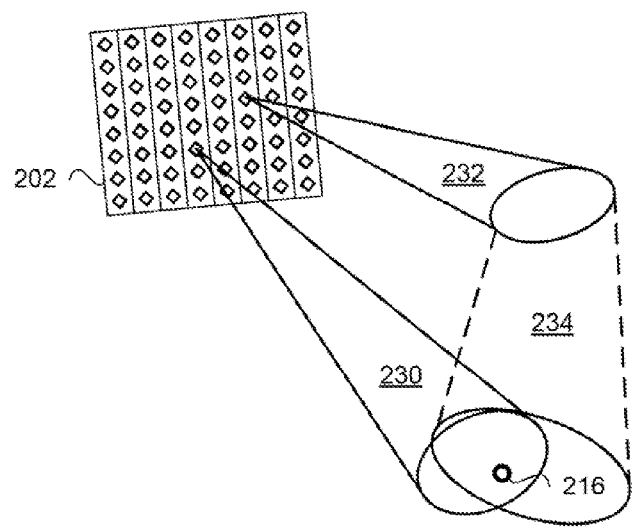
FIG. 8 illustrates a diagram of colliding virtual cells in accordance with an example.

For example, cone collisions can occur due to multipath and % or scattering, as illustrated in FIG. 8. FIG. 8 illustrates multipath of multiple virtual cells (defined by Fks) where a second beam cone 232 reflects 234 on to a spatial region of a first beam cone 230 so the signals collide with each other, which can cause strong interference for a UE 216. With multipath, the UE can observe a weak signal to interference plus noise ratio (SINR), which can be interpreted as a condition similar to the UE being on a cell edge between two cells. A signal-to-interference-plus-noise ratio (SINR) or signal-to-interference ratio (S/I or SIR), also known as the carrier-to-interference ratio (C/I, CIR), refers to the quotient between the average received modulated carrier power S or C and the average received co-channel interference power I (i.e., cross-talk, from other transmitters than the useful signal).

Figure 9:
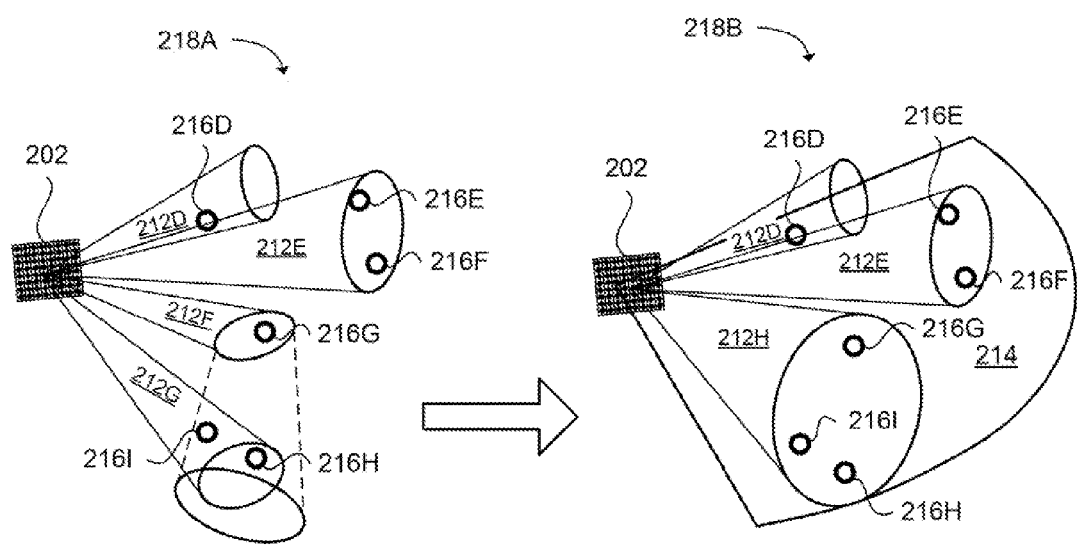
FIG. 9 illustrates a diagram of consolidating colliding virtual cells in accordance with an example.

To reduce interference and/or improve coverage, various mechanisms and protocols can be used to alter the beam cones. For example, the eNB can consolidate the colliding cones 212F-G as one virtual cell or beam cone 212H, as illustrated in FIG. 9. FIG. 9 illustrates consolidating 4 beam cones 212D-G for an eNB 218A into 3 beam cones 212D-E and 212H for the eNB 218B. Each beam cone 212D-H can service a UE 216D-I. In an example, one beam cone 212G can have the same system information as the consolidated beam cone 212H, and another beam cone 212F disappears. In an example, collision reduction via consolidation can be optimized based on UE locations.

In another example, the eNB can shut off one cone without consolidation if no active UE is inside the cone. The UE can report interfering cones or cells based on feedback measurements such as CSI or SINR. The eNB can turn off the cone based on the feedback and observe feedback for further optimization.

In another configuration, the eNB can move one cone away from an interfering position by adjusting or re-defining the precoding matrix Fk. In another example, the eNB can use FDD or TDD to avoid interference for the virtual cells, just as if two legacy cells are cooperating.

With interference between two cones (e.g., 232 and 230, or 212F and 212G), the eNB can use frequency-division multiplexing (FDM) for the pair. In an example, the eNB can control all the cones in the cell by using backhaul link signaling.

In another example, the plurality of beam cones can have non-perfect cell coverage. Even though the number of antennas can be large, any limited number of configurations may lead to imperfect cell coverage and beamforming. For example, the cone-defining beams may not be 'sharp' (e.g., not a focused direction for wider spatial areas), or cone-defining beams may not be perfectly orthogonal. A tradeoff may exist between sharpness and cell coverage, where the cones defined by a specific set of K matrices F may not cover a whole space effectively. In this case, at least two options can be implemented, such as cell scanning.

Figure 10:
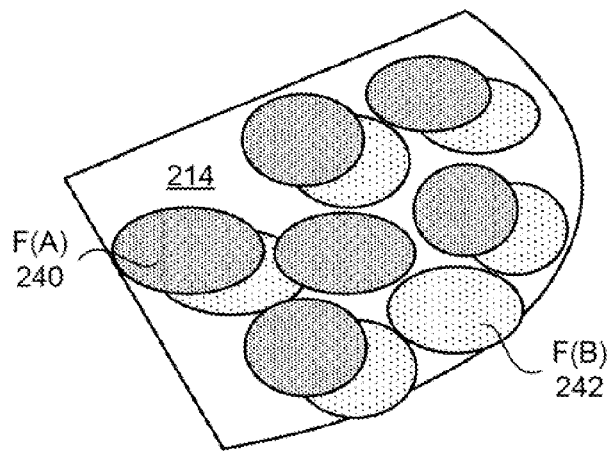
FIG. 10 illustrates a diagram of alternative sets of precoding matrices used for cell scanning in accordance with an example.
Figure 11:
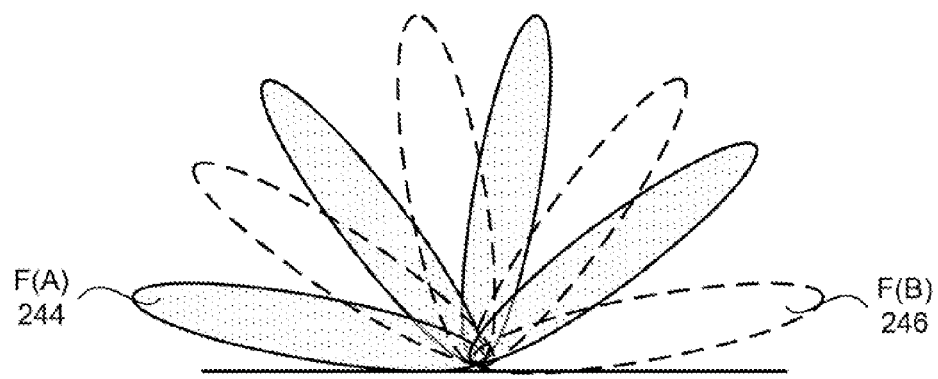
FIG. 11 illustrates a diagram of beam directions of alternative sets of precoding matrices used for cell scanning in accordance with an example.

In cell scanning, several sets of matrices F (e.g., F(A) 240 and F(B) 242) can be designed, and the eNB can alternate turning-on each set of matrices, as illustrated by FIG. 10. FIG. 10 illustrates the spatial area of two sets of beam cones used for cell scanning in a cell 214. The sets of beam cones can be rotated in the time domain to avoid interference with other sets of beam cones. Rotating between several sets of matrices F can provide greater coverage of a spatial area, such as a cell. FIG. 11 illustrates beam directions in 2D of alternative sets of precoding matrices (e.g., F(A) 244 and F(B) 246) used for cell scanning. In an example, each UE can feed back an SINR (or CQI) to the eNB for alternative sets of precoding matrices to select a best beam cone and set of precoding matrices for the UE.

Figure 12:
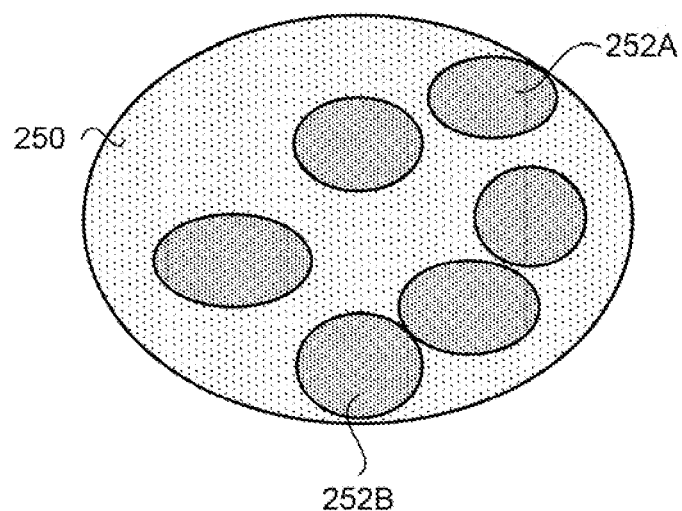
FIG. 12 illustrates a diagram of a virtual cell with wide coverage and small and sharp virtual cells generated by adaptive sectorization using massive multiple-input multiple-output (MIMO) in accordance with an example.

An imitation, variation, or modification of a concept of eICIC can include a wide beam cone and the set of narrow beam cones, as illustrated in FIG. 12. For example, a set of matrices F can be designed for small coverage areas 252A-B (e.g., small cells) with relatively sharp or narrow beams, and a matrix F can be designed for wide overage area 250 (e.g., a 'fat' cell), as back up for general UEs not covered by the set of narrow beam. Then FDM (e.g., inter-cell interference coordination) or TDM (e.g., enhanced inter-cell interference coordination (eICIC) or almost blank subframes (ABS)) can be used between the set of narrow beam cones and the wide beam cone, so that the transmission of the wide beam cone does not interfere with the transmissions of the set of narrow beam cones. In another example (not shown), a set of matrices F can be designed for wide coverage areas, and a much larger set of matrices F can be designed for small coverage areas.

Legacy inter-cell interference coordination (ICIC) or legacy enhanced ICIC (eICIC) may be used for resource coordination to reduce interference between the transmission stations (or nodes). A network can support frequency domain inter-cell interference coordination (ICIC) or time domain enhanced ICIC (eICIC). In an example, ICIC can be used to decrease interference between neighboring cells or nodes (e.g., coordination nodes or cooperation nodes) by lowering the power of a part of the subchannels in the frequency domain which then can be received close to the node. The subchannels do not interfere with the same subchannels used in neighboring cells and thus, data can be sent to mobile devices with less interference on the subchannels close to the cell.

Enhanced ICIC (eICIC) can be used in the time domain for heterogeneous networks (HetNets), where a high power macro cell can be complemented with low power nodes (LPN), such as pico cells (hotspots in shopping centers or at airports) or femto cells (hotspots in small areas such as homes or businesses). The low power nodes can exist inside a macro cell coverage area. The macro cell can transmit long range high power signals, and the low power nodes can transmit low power signals over short distances. In an example to mitigate interference between the macro cell and the several low power nodes located within the macro cell coverage area, eICIC can coordinate the blanking of subframes in the time domain in the macro cell. Alternatively to reduce interference in eICIC, some macro downlink (DL) subframes can be converted into low interference subframes (or almost blank subframes [ABS]) when LPN are transmitting, so subframes for a macro node can be categorized as regular subframes or ABS subframes. The concepts of eICIC can be applied to a wide beam cone and the set of narrow beam cones, as previously described.

Figure 13:
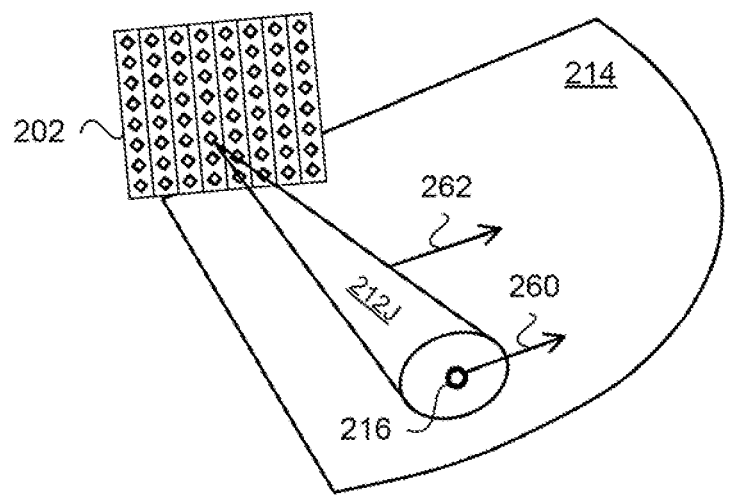
FIG. 13 illustrates a diagram of user equipment (UE) tracking using massive multiple-input multiple-output (MIMO) in accordance with an example.

In another example, the node (e.g., eNB) can provide active or passive UE tracking, as illustrated by FIG. 13. When UEs 216 move 260 around or only a small number of UEs are active within a cell 214, maintaining a virtual cell structure may be costly. Because the eNB can have a large number of antennas in the antenna array 202, the eNB can utilize the observations (e.g., angle of arrival (AoA) measurements) to track UEs by adjusting 262 the cone-defining beams 2121 (e.g., matrices F). When UE tracking is used, the UE can be under a same virtual cell, which can avoid handovers and extensive feedback. The eNB can adapt the virtual cones (e.g., adjusting F) so that the virtual cones cover the 'moving' UEs. From the UE's perspective, the serving cell and/or CQI may not change, even though the UE is actually moving.

For example, in active UE tracking, when a UE determines channel quality changes (e.g., channel quality dramatically drops or fluctuates), which can be due to movement, the UE can actively send out triggering signals to the eNB for the eNB to initialize tracking. Channel quality changes can be determined by calculations based on downlink reference signals (RS) and/or synchronization signals (SS). Alternatively, the UE can determine movement by a motion sensor or using global positioning system (GPS). Depending on rate of the channel changes, the eNB can request more frequent or less CQI reports (or other similar channel quality report). The feedback reports can use standard channel feedback or differential channel feedback.

In another example, passive UE tracking can be implemented, where UE tracking is transparent to the UE. For example, the eNB can determine which UEs are moving and determine to actively monitor 'channel changes' in those UEs. For instance, monitoring 'channel changes' can be determined by calculations based on uplink RS/SS. The eNB can used various mechanisms to determine how to adjust the cone direction.

In an example, certain channel tracking parameters can be reciprocal in both TDD and FDD cases. The large number of antennas can provide accurate estimation on these parameters.

Figure 14:
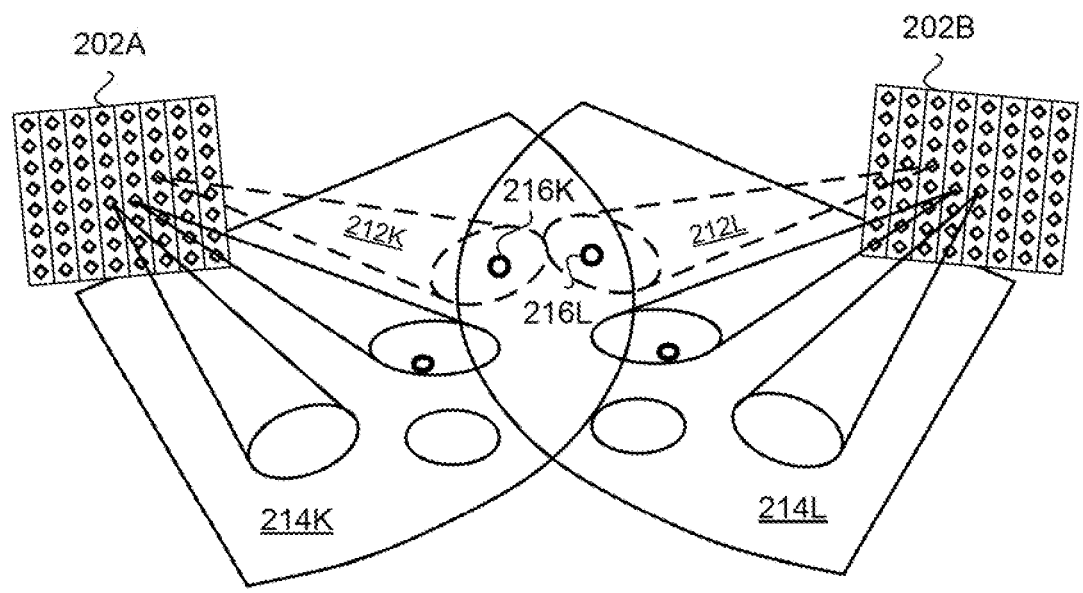
FIG. 14 illustrates a diagram of massive multiple-input multiple-output (MIMO) inter-cell interference coordination in accordance with an example.

In an example, each virtual cell generated by the set of matrices F can be treated as a separate cell. This allows a node (e.g., eNB) to use inter-cell interference coordination (ICIC), as illustrated in FIG. 14. As discussed previously, each eNB (with an antenna array 202K-L) can define one or more sets of cone-forming beams 212K-L for a cell 214K-L. The cone-forming beams can serve UEs 216K-L. For each eNB, the eNB can alternatively turn on a set of beams for adaptive cell coverage or cell scanning. These beams can cause interference to neighboring cells (e.g., physical or virtual cells), just as in real cells. The ICIC can be used in a long-term adaptation.

In an example, an advanced UE can feedback the interference measurement (e.g., virtual cell ID and time-stamp) to its serving eNB. The advanced UE can assist neighboring cells to coordinate a 'cone sweeping' sequence to avoid interference. The UE can monitor neighboring cells to generate the interference measurements. The advanced UE can feedback interference measurement with IDs of several cones to eNB. This interference measurement information can be shared among neighboring eNBs over special links (e.g., backhauls links or X2 interface). In an example, the on-off pattern of the matrices F can be fixed, so neighboring cells can coordinate the patterns to avoid severe interference. In another example, based on interference measurement information, neighboring cells can generate better sweeping patterns to avoid certain severe interfering cones.

In another example, the neighboring eNBs can jointly re-design the cone-defining beams F for better interference coordination. In another example, a single eNB can coordinate between the cone-defining beams F of multiple cells served by the single eNB.

The technology described provides various benefits. For example, multiple virtual small cells can be created, such that MU-transmissions are supported. Independent cell IDs and/or RSs can allow simple management and/or standards. The virtual cells can actually 'move' around (e.g., by just adjusting a defining precoder set), which allows virtual cells to be more flexible compared to fixed physical small cells. The use of virtual cells can be antenna topology (e.g., square or circular cone) independent. For example, an operator can design the sectorization (e.g., cones F) using various cones shapes using different antenna topologies.

Figure 15:
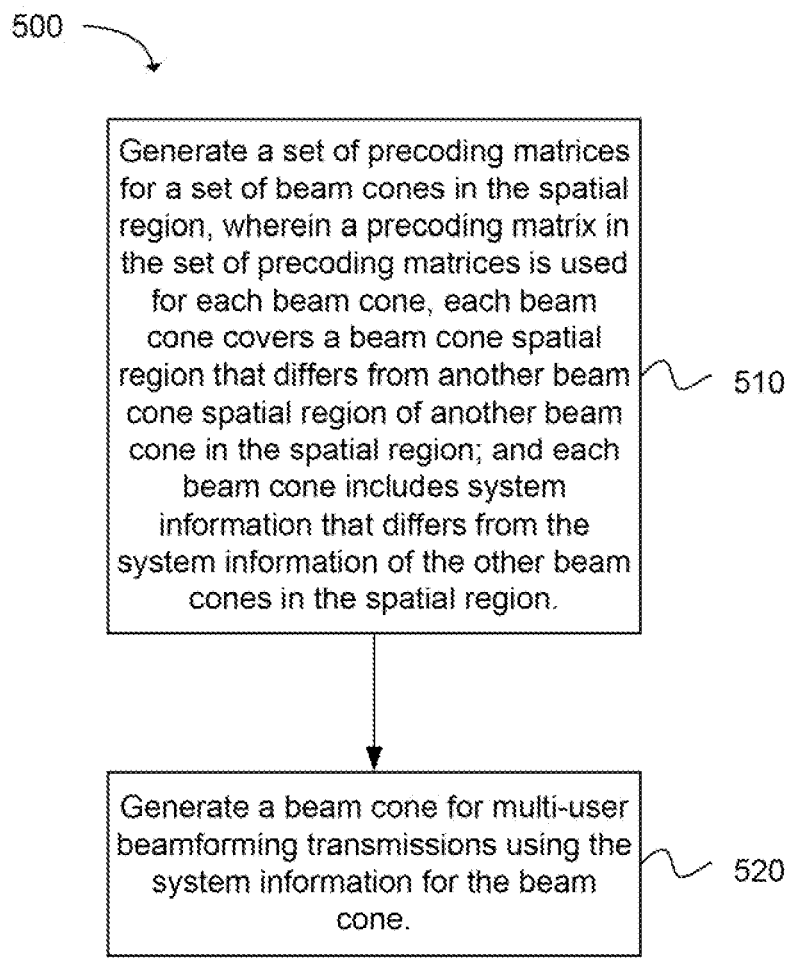
FIG. 15 depicts functionality of computer circuitry of a node (e.g., evolved Node B (eNB)) operable to adaptively sectorize a spatial region for parallel multi-user transmissions in accordance with an example.

Another example provides functionality 500 of computer circuitry of a processor and/or transceiver on a node (e.g., evolved Node B (eNB)) operable to adaptively sectorize a spatial region for parallel multi-user transmissions, as shown in the flow chart in FIG. 15. The functionality may be implemented as a method or the functionality may be executed as instructions on a machine, where the instructions are included on at least one computer readable medium or one non-transitory machine readable storage medium. The computer circuitry can be configured to generate a set of precoding matrices for a set of beam cones in the spatial region, wherein a precoding matrix in the set of precoding matrices is used for each beam cone, each beam cone covers a beam cone spatial region that differs from another beam cone spatial region of another beam cone in the spatial region; and each beam cone includes system information that differs from the system information of the other beam cones in the spatial region, as in block 510. The computer circuitry can be further configured to generate a beam cone for multi-user beamforming transmissions using the system information for the beam cone, as in block 520.

In an example, the system information for each beam cone can include a unique cell-identifier (CID), antenna ports, primary synchronization signals (PSS), secondary synchronization signals (SSS), system information blocks (SIBs), reference signals (RSs), control channels, or physical downlink control channel (PDCCH). RSs can include cell-specific reference signals (CRS), channel state information reference signals (CSI-RS), or demodulation reference signals (DM-RS). In another example, the computer circuitry can be further configured to receive a channel quality indicator (CQI) for an effective channel $H_jF_k$ from a user equipment (UE) j in a virtual cell k formed by the beam cone, wherein the UE j measures channel $H_jF_kS_k$, where $H_j$ is a channel impulse response for the UE j, $F_k$ is a precoding matrix for the virtual cell k, $S_k$ is a reference signal for the virtual cell k, and j and k are integers. $F_k$ can have a dimension M*L, where M is a number of transmit antennas with M>8 transmit antennas, L is a number of corresponding antenna ports with L∈{1,2,4,8}, and M and L are integers In another configuration, the computer circuitry can be further configured to: select a user equipment (UE) uk for a virtual cell k based on a set of channel quality indicator (CQI) reports; and transmit a data signal X to the UE $u_k$, where X is represented by $$X = \sum_k F_k B_{u_k} X_{u_k},$$

where $F_k$ is the precoding matrix for the virtual cell k, $B_{u_k}$ is an UE-specific precoding matrix for the UE $u_k$, and $X_{u_k}$ is a modulation for the UE $u_k$.

In another example, the computer circuitry can be further configured to: Determine when two beam cones signals collide at a user equipment (UE) due to multipath, signal scattering, or signal reflection; and modify a beam cone to avoid a signal collision. The modification can include: Consolidating two beam cones by assigning two precoding matrices used in the colliding signals to a common cell-identifier (CID) forming a single virtual cell; turning off one of the beam cone when no UE within the one beam cone is actively communicating with the node; moving one of the beam cones away from another beam cone by adjusting the CID for the one beam cone to another precoding matrix; or using frequency-division duplexing (FDD) or time-division duplexing (TDD) on one of the beam cones to avoid the signal collision.

In another configuration, the computer circuitry can be further configured to: generate at least two different sets of precoding matrices for the set of beam cones; and rotate between the at least two different sets of precoding matrices for cell scanning and better coverage of the spatial region. Each beam cone can include a cell-identifier (CID), and each set of precoding matrices can cover different spatial regions from each other.

In another example, the computer circuitry can be further configured to: generate a wide area precoding matrix for covering a wide area with a wide beam cone; generate a set of narrow region precoding matrices for covering narrow regions with a set of narrow beam cones; and use frequency-division multiplexing (FDM), time-division multiplexing (TDM), or enhanced inter-cell interference coordination (eICIC) for transmissions using the wide beam cone or the set of narrow beam cones. For example, eICIC can be used to alternate between a normal subframe and an almost blank subframe (ABS) for the wide beam cone. In an example, the set of narrow beam cones can be used within the wide area.

In another configuration, the computer circuitry can be further configured to track a user equipment (UE) by adjusting the beam cone. The computer circuitry can implement active UE tracking or passive UE tracking. For active UE tracking, the computer circuitry can be further configured to: Receive a tracking trigger signal from the UE when a channel quality changes due to UE movement; change the periodicity of receiving a channel quality indicator (CQI) via a request to the UE; and adjust the precoding matrix of a beam cone representing a virtual cell serving the UE to another precoding matrix forming an adjusted beam cone covering a different spatial area from the beam cone of the precoding matrix when the other precoding matrix provides better channel quality than the beam cone of the precoding matrix. The virtual cell can be indexed by a cell-identifier (CID). For passive UE tracking, the computer circuitry can be further configured to: Monitor channel quality changes due to UE movement- and adjust a beam cone direction by adjusting the precoding matrix of the CID serving the UE to another precoding matrix forming an adjusted beam cone covering a different spatial area from the beam cone of the precoding matrix. The adjusted beam cone direction can be based on uplink reference signals (RS) or synchronization signals (SS).

In another example, the computer circuitry can be further configured to: Receive, from a user equipment (UE), an interference measurement feedback message including system information of a neighboring cell; and coordinate scheduling of a set of cone-forming beams with the neighboring cell to avoid inter-cell interference. The system information of the neighboring cell can include a virtual cell-identifier (CID) and a time-stamp. The computer circuitry configured to coordinate scheduling of a set of cone-forming beams can be further configured to coordinate scheduling of the set of cone-forming beams with a neighboring node via backhaul link signaling via a wireless channel, a wired connection, an optical fiber connection, or an X2 interface.

In another configuration, computer circuitry configured to generate the beam cone can be further configured to dynamically and adaptively generate beam cones via an antenna array with at least two rows and at least two columns of antenna radiation elements. Each antenna radiation element can represent a transmit antenna. In another example, the node can include M transmit antennas with M>8 transmit antennas (i.e., number of transmit antennas is greater than eight antennas). The node can comprise a base station (BS), a Node B (NB), an evolved Node B (eNB), a baseband unit (BBU), a remote radio head (RRH), a remote radio equipment (RRE), a remote radio unit (RRU), or a central processing module (CPM).

Figure 16:
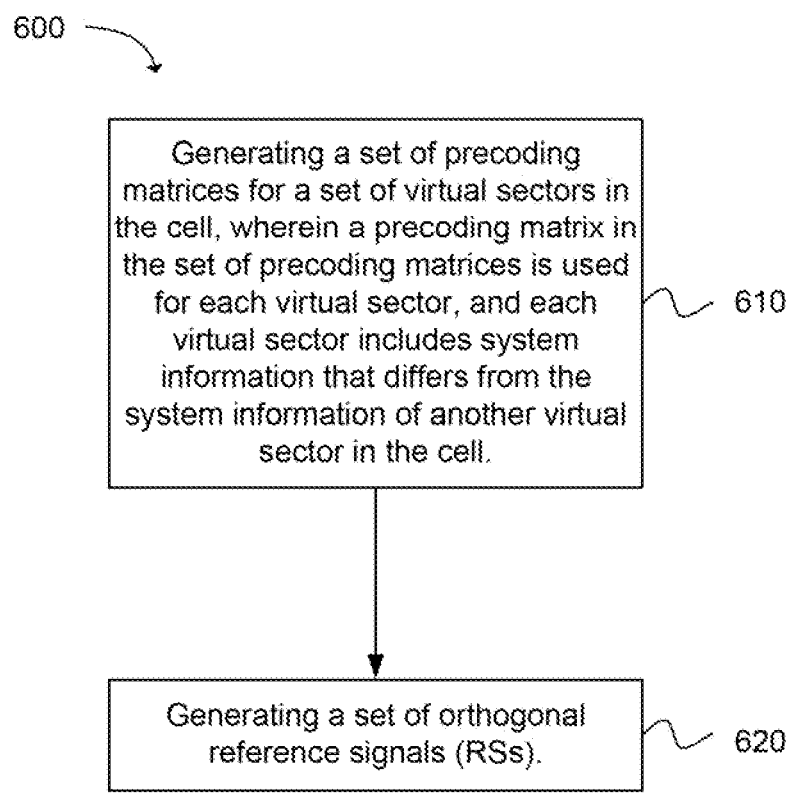
FIG. 16 depicts a flow chart of a for dividing a cell into virtual sectors for parallel multi-user transmissions in the cell at an evolved Node B (eNB) in accordance with an example.

Another example provides a method 600 for dividing a cell into virtual sectors for parallel multi-user transmissions in the cell at an evolved Node B (eNB), as shown in the flow chart in FIG. 16. The method may be executed as instructions on a machine, computer circuitry, or a processor for the node (e.g., eNB), where the instructions are included on at least one computer readable medium or one non-transitory machine readable storage medium. The method includes the operation of generating a set of precoding matrices for a set of virtual sectors in the cell, wherein a precoding matrix in the set of precoding matrices is used for each virtual sector, and each virtual sector includes system information that differs from the system information of another virtual sector in the cell, as in block 610. The operation of generating a multi-user beamforming transmission for a virtual sector using the precoding matrix and system information associated with the precoding matrix follows, as in block 620.

In an example, the method can further include adaptively transmitting the multi-user beamforming transmission to a user equipment (UE) within the virtual sector using a large antenna array. The large antenna array can include at least two rows and at least two columns of antenna radiation elements, and the large antenna array can have more than eight antenna radiation elements. In another example, the system information for each virtual sector can include a unique cell-identifier (CID), antenna ports, primary synchronization signals (PSS), secondary synchronization signals (SSS), system information blocks (SIBs), reference signals (RSs), control channels, or physical downlink control channel (PDCCH).

In another configuration, the method can further include receiving a channel quality indicator (CQI) for an effective channel $H_j F_k$ from a user equipment (UE) j in a virtual sector k, where the UE j measures channel $H_jF_kS_k$, where $H_j$ is a channel impulse response for the UE j, $F_k$ is a precoding matrix for the virtual sector k, $S_k$ is a reference signal for the virtual sector k, and j and k are integers.

In another example, the method can further include: Selecting a user equipment (UE) $u_k$ for a virtual sector k based on a set of channel quality indicator (CQI) reports; and transmit a data signal X to the UE $u_k$, wherein X is represented by $$X = \sum_k F_k B_{u_k} X_{u_k},$$

where $F_k$ is the precoding matrix for the virtual sector k. $B_{u_k}$ is an UE-specific precoding matrix for the UE $u_k$, and $X_{u_k}$ is a modulation for the UE $u_k$.

In another configuration, the method can further include: Determining when two signals from different virtual sectors interfere with each other at a user equipment (UE) due to multipath signaling, signal scattering, or signal reflection; and modifying a transmission of one virtual sector to avoid signal interference. The modification can include: Consolidating two virtual sectors by assigning a precoding matrix used in the interfering signal of the one virtual sector to the same cell-identifier (CID) as the other virtual sector generating the interference to form a common CID for a single virtual sector; turning off the one virtual sector when no UE within the one virtual sector is actively communicating with the eNB; or moving the one virtual sector away from another virtual sector by adjusting the one virtual sector's precoding matrix to a different precoding matrix while using a same CID.

In another example, the method can further include: Generating at least two different sets of precoding matrices for the set of virtual sectors; and switching between the at least two different sets of precoding matrices for cell scanning and better coverage of the cell. Each virtual sector can include a cell-identifier (CID), and each set of precoding matrices can cover different spatial regions from each other.

In another configuration, the method can further include: Generating a wide precoding matrix for a wide virtual sector used in a wide cell within a wide cell spatial region; generating a set of narrow precoding matrices for a set of narrow virtual sector used in narrow cells within the wide cell spatial region; and scheduling transmissions between the wide virtual sector and the set of narrow virtual sectors using frequency-division multiplexing (FDM), time-division multiplexing (TDM), or enhanced inter-cell interference coordination (eICIC).

In another example, the method can further include: Receiving, from a user equipment (UE), an interference feedback message including neighboring cell system information; and coordinating a schedule of a set of virtual sector transmissions with a neighboring cell to avoid inter-cell interference. The neighboring cell system information can include a virtual cell-identifier (CID) and/or a resource identifier (e.g., a time-stamp). The cell and the neighboring cell can be served by the eNB. Or, in another example, the cell can be served by the eNB and the neighboring cell can be served by a neighboring eNB and the eNB and the neighboring eNB communicate via backhaul link signaling via a wireless channel, a wired connection, an optical fiber connection, or an X2 interface.

Figure 17:
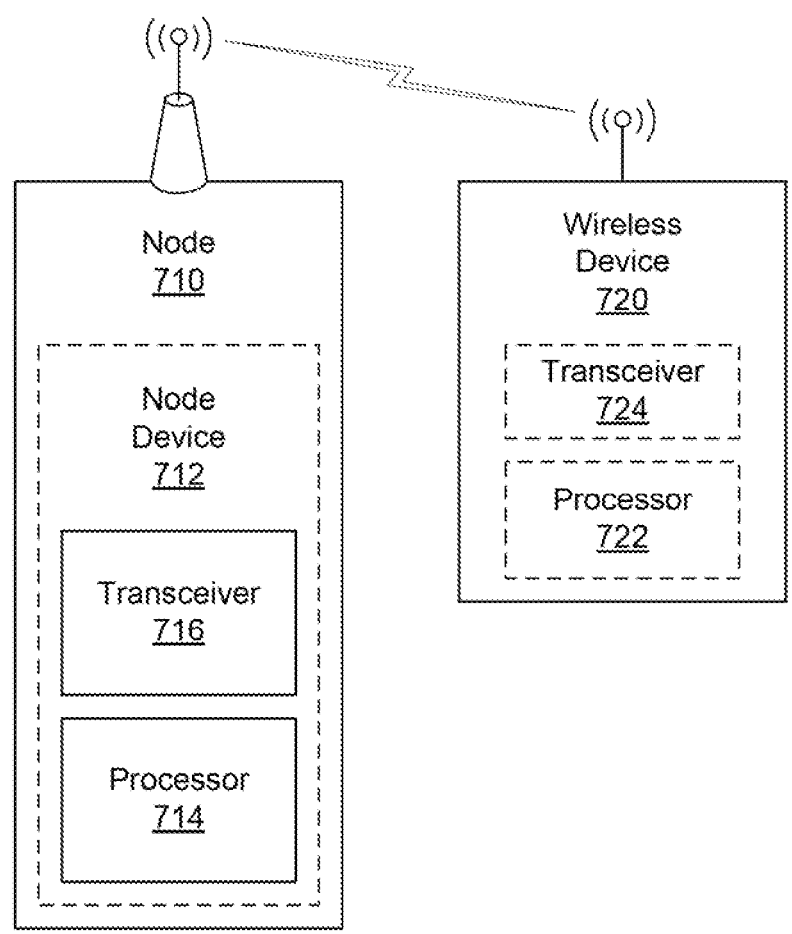
FIG. 17 illustrates a block diagram of a node (e.g., eNB) and wireless device (e.g., UE) in accordance with an example.

FIG. 17 illustrates an example node 710 (e.g., eNB) and an example wireless device 720 (e.g., UE). The node can include a node device 712. The node device or the node can be configured to communicate with the wireless device (e.g., UE). The node device can include a processor 714 and a transceiver 716. The processor 714 and/or transceiver 716 can be configured to adaptively sectorize a spatial region for parallel multi-user transmissions, as described in 500 of FIG. 15. In another example, the processor 714 and/or transceiver 716 can be configured for dividing a cell into virtual sectors for parallel multi-user transmissions in the cell at an evolved Node B (eNB), as described in 600 of FIG. 16.

Referring back to FIG. 17, the wireless device 720 (e.g., user equipment (UE)) can be configured for tracking a beamforming cone relative to movement of the UE. The wireless device can include a transceiver 724 and a processor 722. The transceiver 724 can be configured to receive downlink signals over a duration of time from an evolved Node B (eNB) in a virtual cell of a beamforming cone. The processor 722 can be configured to: Measure a channel quality of a channel for the downlink signal of the virtual cell over the duration of time; and determine when a change in the channel quality crosses a channel quality threshold due to LE movement. The transceiver 724 can be further configured to transmit a triggering signal to the eNB to initialize tracking of the beamforming cone for the virtual cell.

In another example, initializing tracking of a beamforming cone changes a precoding matrix associated with the virtual cell. In another configuration, the wireless device 720 includes a motion sensor (not shown) configured to determine when the UE is in motion.

In another example, the transceiver 724 can be further configured to transmit a channel quality indicator (CQI) for each channel quality measurement of the channel represented by $H_jF_kS_k$, where $H_j$ is a channel impulse response for a UE j, $F_k$ is a precoding matrix for the virtual cell k, $S_k$ is a reference signal for the virtual cell k, and j and k are integers; and receive a data signal Y in virtual cell k, where Y is represented by $Y_{u_i}=(H_{u_i}F_i)B_{u_i}X_{u_i}+\text{Interference}+\text{Noise}$, where $H_{u_i}$ is a channel impulse response for the UE $u_i$, $F_i$ is the precoding matrix for the virtual cell i, $B_{u_i}$ is an UE-specific precoding matrix for the UE $u_i$, $X_{u_i}$ is a modulation for the UE $u_i$, and Interference is represented by $$\sum_{k \ne i} (H_{u_i} F_k) B_{u_k} X_{u_k},$$

where $F_k$ is the precoding matrix for the virtual cell k, $B_{u_k}$ is an UE-specific precoding matrix for a UE $u_k$, and $X_{u_k}$ is a modulation for the UE $u_k$.

In another configuration, the processor 722 can be further configured to: measure an interference from a neighboring cell including neighboring cell system information; and generate a time-stamp for the interference. The neighboring cell system information can include a virtual cell-identifier (CID). The transceiver 724 can be further configured to send an interference measurement feedback message including the neighboring cell system information and the time-stamp to a serving cell via an evolved Node B (eNB) to configure the serving cell to reduce inter-cell interference with the neighboring cell.

Figure 18:
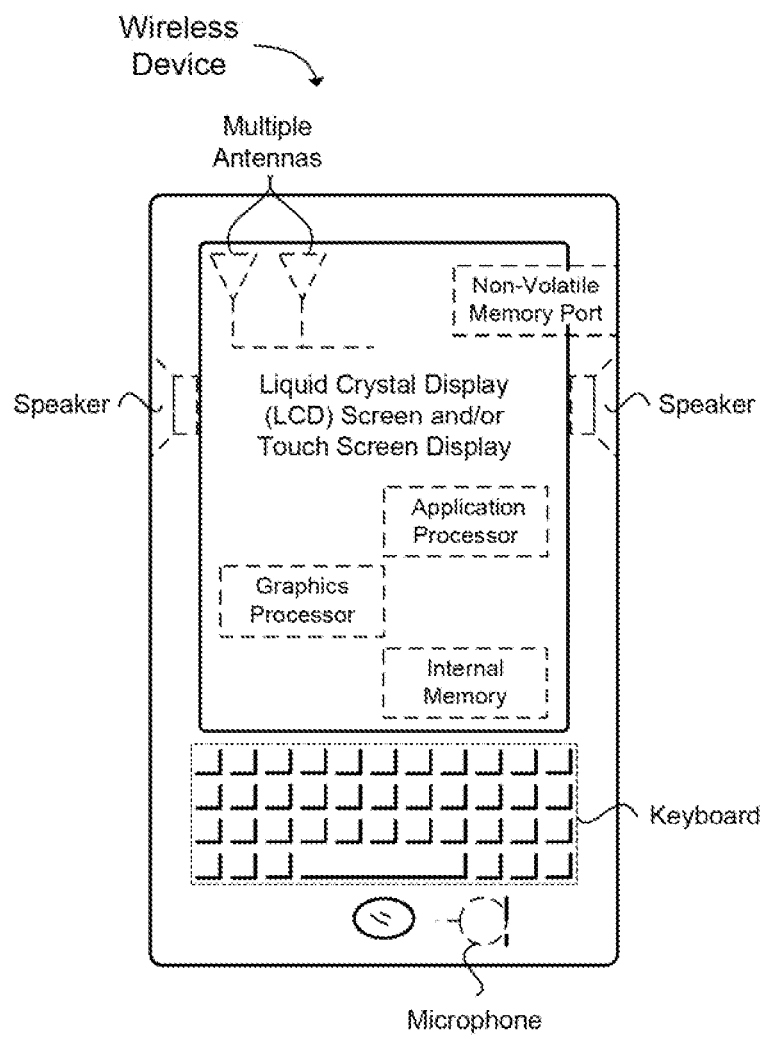
FIG. 18 illustrates a diagram of a wireless device (e.g., UE) in accordance with an example.

FIG. 18 provides an example illustration of the wireless device, such as a user equipment (UE), a mobile station (MS), a mobile wireless device, a mobile communication device, a tablet, a handset, or other type of wireless device.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 18 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A node operable to adaptively sectorize a spatial region for parallel multi-user transmissions, having computer circuitry configured to:
generate a set of precoding matrices for a set of beam cones in the spatial region, wherein a precoding matrix in the set of precoding matrices is used for each beam cone, each beam cone covers a beam cone spatial region that differs from another beam cone spatial region of another beam cone in the spatial region; and each beam cone includes system information that differs from the system information of the other beam cones in the spatial region;
generate a beam cone for multi-user beamforming transmissions using the system information for the beam cone; and
receive a channel quality indicator (CQI) for an effective channel $H_j F_k$ from a user equipment (UE) j in a virtual cell k formed by the beam cone, where $H_j$ is a channel impulse response for the UE j, UE j measures channel $H_j F_k S_k$, $F_k$ is a precoding matrix for the virtual cell k, $S_k$ is a reference signal for the virtual cell k and j and k are integers.

2. The computer circuitry of claim 1, wherein the system information for each beam cone includes a unique cell-identifier (CID), antenna ports, primary synchronization signals (PSS), secondary synchronization signals (SSS), system information blocks (SIBs), reference signals (RSs), control channels, or physical downlink control channel (PDCCH).

3. The computer circuitry of claim 1, wherein $F_k$ has a dimension M*L, where M is a number of transmit antennas, L is a number of corresponding antenna ports with L $\in \{1,2,4,8\}$, and M and L are integers.

4. The computer circuitry of claim 1, wherein the computer circuitry is further configured to:
select a user equipment (UE) $u_k$ for a virtual cell k based on a set of channel quality indicator (CQI) reports; and
transmit a data signal X to the UE $u_k$, wherein X is represented by $$X = \sum_k F_k B_{u_k} X_{u_k},$$

where $F_k$ is the precoding matrix for the virtual cell k, $B_{u_k}$ is an UE-specific precoding matrix for the UE $u_k$, and $X_{u_k}$ is a modulation for the UE $u_k$.

5. The computer circuitry of claim 1, wherein the computer circuitry is further configured to:
determine when two beam cones signals collide at a user equipment (UE) due to multipath, signal scattering, or signal reflection; and
modify a beam cone to avoid a signal collision, wherein the modification includes:
consolidating two beam cones by assigning two precoding matrices used in the colliding signals to a common cell-identifier (CID) forming a single virtual cell;
turning off one of the beam cone when no UE within the one beam cone is actively communicating with the node;
moving one of the beam cones away from another beam cone by adjusting the CID for the one beam cone to another precoding matrix; or
using frequency-division duplexing (FDD) or time-division duplexing (TDD) on one of the beam cones to avoid the signal collision.

6. The computer circuitry of claim 1, wherein the computer circuitry is further configured to:
generate at least two different sets of precoding matrices for the set of beam cones, wherein each beam cone includes a cell-identifier (CID), and each set of precoding matrices cover different spatial regions from each other; and
rotate between the at least two different sets of precoding matrices for cell scanning and better coverage of the spatial region.

7. The computer circuitry of claim 1, wherein the computer circuitry is further configured to:
generate a wide area precoding matrix for covering a wide area with a wide beam cone;
generate a set of narrow region precoding matrices for covering narrow regions with a set of narrow beam cones; and
use frequency-division multiplexing (FDM), time-division multiplexing (TDM), or enhanced inter-cell interference coordination (eICIC) for transmissions using the wide beam cone or the set of narrow beam cones.

8. The computer circuitry of claim 1, wherein the computer circuitry is further configured to:
track a user equipment (UE) by adjusting the beam cone, wherein the computer circuitry implements active UE tracking or passive UE tracking, wherein:
for active UE tracking, the computer circuitry is further configured to:
receive a tracking trigger signal from the UE when a channel quality changes due to UE movement;
change the periodicity of receiving a channel quality indicator (CQI) via a request to the UE; and
adjust the precoding matrix of a beam cone representing a virtual cell serving the UE to another precoding matrix forming an adjusted beam cone covering a different spatial area from the beam cone of the precoding matrix when the other precoding matrix provides better channel quality than the beam cone of the precoding matrix, wherein the virtual cell is indexed by a cell-identifier (CID); and
for passive UE tracking, the computer circuitry is further configured to:
monitor channel quality changes due to UE movement; and
adjust a beam cone direction by adjusting the precoding matrix of the CID serving the UE to another precoding matrix forming an adjusted beam cone covering a different spatial area from the beam cone of the precoding matrix, wherein the adjusted beam cone direction is based on uplink signals, and uplink signals include uplink reference signals (RS) or synchronization signals (SS).

9. The computer circuitry of claim 1, wherein the computer circuitry is further configured to:
receive, from a user equipment (UE), an interference measurement feedback message including system information of a neighboring cell, wherein the system information of the neighboring cell includes a virtual cell-identifier (CID) and a time-stamp; and
coordinate scheduling of a set of cone-forming beams with the neighboring cell to avoid inter-cell interference.

10. The computer circuitry of claim 9, wherein computer circuitry configured to coordinate scheduling of a set of cone-forming beams is further configured to:
coordinate scheduling of the set of cone-forming beams with a neighboring node via backhaul link signaling via a wireless channel, a wired connection, an optical fiber connection, or an X2 interface.

11. The computer circuitry of claim 1, wherein computer circuitry configured to generate the beam cone is further configured to dynamically and adaptively generate beam cones via an antenna array with at least two rows and at least two columns of antenna radiation elements, wherein each antenna radiation element represents a transmit antenna.

12. The computer circuitry of claim 1, wherein the node includes M transmit antennas with M >8 transmit antennas and the node includes a base station (BS), a Node B (NB), an evolved Node B (eNB), a baseband unit (BBU), a remote radio head (RRH), a remote radio equipment (RRE), a remote radio unit (RRU), or a central processing module (CPM).

13. A method for dividing a cell into virtual sectors for parallel multi-user transmissions in the cell at an evolved Node B (eNB), comprising:
generating a set of precoding matrices for a set of virtual sectors in the cell, wherein a precoding matrix in the set of precoding matrices is used for each virtual sector, and each virtual sector includes system information that differs from the system information of another virtual sector in the cell;
generating a multi-user beamforming transmission for a virtual sector using the precoding matrix and system information associated with the precoding matrix; and
receiving a channel quality indicator (CQI) for an effective channel $H_j F_k$ from a user equipment (UE) j in a virtual sector k, where $H_j$ is a channel impulse response for the UE j, $F_k$ is a precoding matrix for the virtual sector k wherein the UE measures channel $H_j F_k S_k$, $S_k$ is a reference signal for the virtual sector k, and j and k are integers.

14. The method of claim 13, further comprising:
adaptively transmitting the multi-user beamforming transmission to a user equipment (UE) within the virtual sector using a large antenna array, wherein the large antenna array includes at least two rows and at least two columns of antenna radiation elements, and the large antenna array has more than eight antenna radiation elements.

15. The method of claim 13, wherein the system information for each virtual sector includes a unique cell-identifier (CID), antenna ports, primary synchronization signals (PSS), secondary synchronization signals (SSS), system information blocks (SIBs), reference signals (RSs), control channels, or physical downlink control channel (PDCCH).

16. The method of claim 13, further comprising:
selecting a user equipment (UE) $u_k$ for a virtual sector k based on a set of channel quality indicator (CQI) reports; and
transmit a data signal X to the UE $u_k$, wherein X is represented by $$X = \sum_k F_k B_{u_k} X_{u_k},$$

where $F_k$ is the precoding matrix for the virtual sector k, $B_{u_k}$ is an UE-specific precoding matrix for the UE $u_k$, and $X_{u_k}$ is a modulation for the UE $u_k$.

17. The method of claim 13, further comprising:
determining when two signals from different virtual sectors interfere with each other at a user equipment (UE) due to multipath signaling, signal scattering, or signal reflection; and
modifying a transmission of one virtual sector to avoid signal interference, wherein the modification includes:
consolidating two virtual sectors by assigning a precoding matrix used in the interfering signal of the one virtual sector to the same cell-identifier (CID) as the other virtual sector generating the interference to form a common CID for a single virtual sector;
turning off the one virtual sector when no UE within the one virtual sector is actively communicating with the eNB; or
moving the one virtual sector away from another virtual sector by adjusting the one virtual sector's precoding matrix to a different precoding matrix while using a same CID.

18. The method of claim 13, further comprising:
generating at least two different sets of precoding matrices for the set of virtual sectors, wherein each virtual sector includes a cell-identifier (CID), and each set of precoding matrices cover different spatial regions from each other; and
switching between the at least two different sets of precoding matrices for cell scanning and better coverage of the cell.

19. The method of claim 13, further comprising:
generating a wide precoding matrix for a wide virtual sector used in a wide cell within a wide cell spatial region;
generating a narrow set of precoding matrices for a set of narrow virtual sector used in narrow cells within the wide cell spatial region; and
scheduling transmissions between the wide virtual sector and the set of narrow virtual sectors using frequency-division multiplexing (FDM), time-division multiplexing (TDM), or enhanced inter-cell interference coordination (eICIC).

20. The method of claim 13, further comprising:
receiving, from a user equipment (UE), an interference feedback message including neighboring cell system information, wherein the neighboring cell system information includes a virtual cell-identifier (CID) or a resource identifier; and
coordinating a schedule of a set of virtual sector transmissions with a neighboring cell to avoid inter-cell interference, wherein the cell and the neighboring cell is served by the eNB, or the cell is served by the eNB and the neighboring cell is served by a neighboring eNB and the eNB and the neighboring eNB communicate via backhaul link signaling via a wireless channel, a wired connection, an optical fiber connection, or an X2 interface.

21. At least one non-transitory machine readable storage medium comprising a plurality of instructions adapted to be executed to implement the method of claim 13.

* * * * *